US012404706B2

(12) United States Patent
Audirac

(10) Patent No.: US 12,404,706 B2
(45) Date of Patent: Sep. 2, 2025

(54) DEVICE FOR LOCKING A DOOR

(71) Applicant: Lionel Audirac, Narbonne (FR)

(72) Inventor: Lionel Audirac, Narbonne (FR)

( * ) Notice: Subject to any disclaimer, the term of this patent is extended or adjusted under 35 U.S.C. 154(b) by 186 days.

(21) Appl. No.: 17/999,397

(22) PCT Filed: May 20, 2021

(86) PCT No.: PCT/EP2021/063442
§ 371 (c)(1),
(2) Date: Nov. 20, 2022

(87) PCT Pub. No.: WO2021/234076
PCT Pub. Date: Nov. 25, 2021

(65) Prior Publication Data

US 2023/0203858 A1 Jun. 29, 2023

(30) Foreign Application Priority Data

May 20, 2020 (FR) ....................................... 2005339

(51) Int. Cl.
*E05C 1/00* (2006.01)
*E05B 1/00* (2006.01)
(Continued)

(52) U.S. Cl.
CPC ............ *E05C 1/004* (2013.01); *E05B 1/0046* (2013.01); *E05B 9/002* (2013.01); *E05B 17/06* (2013.01);
(Continued)

(58) Field of Classification Search
CPC . E05C 1/004; E05C 1/04; E05C 1/166; E05C 1/02; E05C 1/06; E05C 1/08;
(Continued)

(56) References Cited

U.S. PATENT DOCUMENTS 245,541 A * 8/1881 Montant ............. E05B 65/0864 292/57
283,770 A * 8/1883 Geiger .................. E05B 53/001 49/379
(Continued)

FOREIGN PATENT DOCUMENTS

BR 202019003597 U2 * 10/2020 ............. E05B 53/00
CA 2641400 A1 * 4/2010 ........... E05B 1/0053
(Continued)

OTHER PUBLICATIONS

ISR: European Patent Office: Sep. 23, 2021.

*Primary Examiner* — Kristina R Fulton
*Assistant Examiner* — Steven A Tullia
(74) *Attorney, Agent, or Firm* — Patshegen IP; Moshe Pinchas

(57) ABSTRACT

The invention relates to a device (200) for locking a door, which comprises: a bolt (40) comprising a bar (52) configured to engage in a housing secured to the frame (80) accommodating the door and a pusher means secured to the bar (41) and spaced apart from the bar by a stem and in which the bolt is positioned on the door at a height relative to the foot of the door of between thirty and eighty centimetres, such that the bar of the bolt can be engaged with or disengaged from the housing secured to the frame by pressure applied by a user's knee against the pusher means.

14 Claims, 11 Drawing Sheets

(51) Int. Cl.
*E05B 9/00* (2006.01)
*E05B 17/06* (2006.01)
*E05B 53/00* (2006.01)
*E05C 1/04* (2006.01)
*E05C 1/16* (2006.01)

(52) U.S. Cl.
CPC .............. *E05B 53/001* (2013.01); *E05C 1/04* (2013.01); *E05C 1/166* (2013.01)

(58) Field of Classification Search
CPC ..... E05C 1/10; E05C 1/12; E05C 1/16; E05B 1/0046; E05B 1/0069; E05B 1/0053; E05B 1/0038; E05B 9/002; E05B 9/00; E05B 9/02; E05B 9/025; E05B 9/026; E05B 17/06; E05B 53/00; E05B 53/001; E05B 53/003; E05B 53/005; Y10T 292/19
See application file for complete search history.

(56) References Cited

U.S. PATENT DOCUMENTS

| | | | | | | |
|---|---|---|---|---|---|---|
| 956,086 | A | * | 4/1910 | Harrison | E05B 65/0864 | 292/175 |
| 1,271,445 | A | * | 7/1918 | Diggs | E05B 53/001 | 292/255 |
| 1,583,818 | A | * | 5/1926 | White | E05B 53/001 | 292/171 |
| 1,603,722 | A | * | 10/1926 | Stanley | E05B 53/001 | 292/255 |
| 1,646,136 | A | * | 10/1927 | Booth | E05C 1/04 | 292/145 |
| 1,724,116 | A | * | 8/1929 | Swearengin | E05C 1/10 | 292/145 |
| 1,847,564 | A | | 3/1932 | Hood | | |
| 2,046,790 | A | * | 7/1936 | Phillips | E05C 17/446 | 292/179 |
| 2,120,534 | A | * | 6/1938 | Gunther | E05B 53/001 | 292/170 |
| 2,238,513 | A | | 4/1941 | Ward | | |
| 2,862,750 | A | * | 12/1958 | Minke | E05B 53/00 | 292/336.3 |
| 3,938,836 | A | * | 2/1976 | Smith | E05C 1/04 | 292/148 |
| 4,275,910 | A | * | 6/1981 | Budish | E05C 1/04 | 49/67 |
| 5,193,863 | A | * | 3/1993 | McBain | E05B 53/001 | 292/336.3 |
| 5,217,265 | A | * | 6/1993 | Lerner | E05B 37/163 | 292/196 |
| 5,603,184 | A | * | 2/1997 | Campbell | E05C 1/04 | 292/145 |
| 6,189,183 | B1 | * | 2/2001 | Hartselle, III | E05B 1/0069 | 16/412 |
| 6,684,570 | B1 | * | 2/2004 | Robledo | E05B 65/0035 | 292/147 |
| 7,003,889 | B1 | * | 2/2006 | Luciani | E05B 17/06 | 33/562 |
| 7,025,394 | B1 | * | 4/2006 | Hunt | E05C 9/021 | 70/191 |
| 7,043,800 | B2 | * | 5/2006 | Moody | E05B 53/001 | 16/901 |
| 8,888,149 | B2 | * | 11/2014 | Lehr | E05B 53/001 | 292/201 |
| 9,115,530 | B2 | * | 8/2015 | Michael | E05C 17/50 | |
| 9,394,732 | B1 | * | 7/2016 | Ahmad | E05B 1/0046 | |
| 10,612,275 | B2 | * | 4/2020 | Lynn | E05B 67/38 | |
| 11,447,979 | B2 | * | 9/2022 | Taylor | E05B 1/0053 | |
| 11,828,084 | B2 | * | 11/2023 | Chu | E05B 53/001 | |
| 2004/0251694 | A1 | * | 12/2004 | Gorski | E05B 65/0007 | 292/175 |
| 2020/0071962 | A1 | * | 3/2020 | Markway | E05B 1/0046 | |

FOREIGN PATENT DOCUMENTS

| | | | | | |
|---|---|---|---|---|---|
| DE | 204640 | C | | 12/1907 | |
| DE | 204683 | C | | 12/1907 | |
| DE | 102006038456 | A1 | * | 2/2008 | E05B 1/0053 |
| EP | 0911468 | A1 | * | 4/1999 | E05C 1/04 |
| EP | 1048811 | A1 | * | 11/2000 | E05B 53/001 |
| EP | 1889990 | A2 | * | 2/2008 | E05B 1/0053 |
| EP | 2460958 | A2 | | 11/2011 | |
| EP | 1781874 | B1 | * | 7/2018 | A47K 13/105 |
| EP | 4133148 | B1 | * | 6/2024 | E05B 1/0069 |
| FR | 2951487 | A1 | | 4/2011 | |
| FR | 2993913 | A1 | | 1/2014 | |
| GB | 142562 | A | * | 5/1920 | E05C 1/10 |
| GB | 2272726 | A | | 5/1994 | |
| JP | 10121793 | A | * | 5/1998 | E05B 3/00 |
| JP | 353030496 | U | | 5/2012 | |
| KR | 940005792 | U | | 3/1994 | |
| KR | 10-2012-0000657 | A | | 1/2012 | |
| KR | 101163524 | B1 | | 7/2012 | |
| KR | 20120006286 | U | | 9/2012 | |
| WO | WO-0231297 | A1 | * | 4/2002 | E05B 65/1053 |
| WO | WO-2021205484 | A1 | * | 10/2021 | E05B 1/0069 |
| WO | WO-2022091956 | A1 | * | 5/2022 | E05B 5/00 |

* cited by examiner

DEVICE FOR LOCKING A DOOR

TECHNICAL FIELD OF THE INVENTION

The present invention relates to a device for actuating and locking a door. The implementation of the invention is especially useful for the opening, closing and locking of a swing door with no contact of the user's hand with the door or with the actuation and locking device.

STATE OF THE ART

To limit the transmission of germs through hands coming into contact with the handles or surfaces of doors, it is desirable to keep these contacts to a minimum.

The prior art knows automatic doors whose opening is actuated by a motion sensor or weight sensor when detecting the presence of a user. However, the installation of this type of automatic door is costly and requires heavy maintenance.

The prior art knows doors mobile around a hinge with an arc of about 180 degrees and which the user can push with his foot or shoulder. This type of door has the drawback of requiring a large space for its installation, because the door can only be pushed.

In addition there is no practical system of use and implementation making it possible to lock a door with no contact between the user's hands and the handle or other surfaces of the door.

DESCRIPTION OF THE INVENTION

The present invention aims to remedy all or part of these drawbacks.

To this end, according to a first aspect, the invention envisages a device for locking a door, which comprises:

- a bolt comprising a bar configured to engage in a housing secured to the frame accommodating the door; and
- a pusher means secured to the bar;

the bolt being positioned on the door at a height of between thirty and eighty centimetres relative to the foot of the door, such that the bar of the bolt can be engaged with or disengaged from the housing secured to the frame by pressure applied by a user's knee against the pusher means; wherein the bar of the bolt slides in a panel secured to a pull plate fixed to the door, and wherein the pull plate comprises an extension positioned close to the foot of the door and configured to be driven by the foot or the lower leg of the user.

Thanks to these provisions, the door can be locked or unlocked by a user without needing to grasp a lock or a handle or to touch the surface of a door with the hand. Avoiding direct contact between the user's hand and the door or handle makes it possible to prevent infection through contact with a bacterium, virus or any other germ. As hands are known to be a main vector of infection because of their very frequent contact with the face and with all kinds of objects, the locking device improves hygiene and reduces the risk of infection between users of the same door.

The locking device that is the subject of the invention is suitable for implementation on any type of door. However, it is especially suitable for implementation on a frequently used door, for example in company premises or in public places, and on doors in places that are known sources of contamination, such as toilet doors.

Thanks to the bar of the bolt, which slides in a panel secured to a pull plate fixed to the door, and to the extension positioned close to the foot of the door and configured to be driven by the foot or the lower leg of the user, the door can be driven by the user with no contact between his hands and the door. In addition, the pull plate prolongs the life of the device by spreading the forces, exerted over the surface of the pull plate by the user pushing or pulling on the device.

In some embodiments, the door is sandwiched between the pull plate and a backplate connected to the pull plate by fastening means.

Thanks to these provisions, the assembly formed of the pull plate, backplate and door is made more solid and long-lasting.

In some embodiments, the device comprises a through hole aligned with a grasping relief positioned on the bar, such that the bolt can be engaged or disengaged by a pressure exerted by means of a tool on the grasping relief, from the side of the door opposite the side on which the pusher means of the bolt is positioned.

Thanks to these provisions, the door can be locked or unlocked from the side of the door opposite the side on which the pusher means of the bolt is positioned. These provisions are especially useful for unlocking a door in an emergency or for locking a door when it is desirable to prohibit access.

In some embodiments, the free extremity of the pusher means is spaced at least four centimetres from the door by a stem. Preferably, the free extremity of the pusher means is spaced at an interval of at least six centimetres, for example eight centimetres. Thanks to these provisions, it is easier for the user's knee to exert pressure on the pusher means.

In some embodiments, the device comprises a pedal secured to a rod actuating a latch, such that the latch can be disengaged from a striker by pressure of a user's foot on the pedal.

Thanks to these provisions, the use of a handle to open the door is no longer necessary, and the disengagement of the latch and opening of the door can be achieved solely by the user's foot on the pedal.

In some embodiments, the pedal comprises an elastic return means for the pedal enabling the latch to be returned to a rest position.

Thanks to these provisions, in a similar way to the normal operation of a door handle, the latch is reengaged in the striker of the door when the striker and latch are aligned to each other and the user releases the pedal.

In some embodiments, the pedal is connected to the latch by a cable.

Thanks to these provisions, the device is particularly light and the links between a pedal and the latch can be incorporated into the body of the door.

In some embodiments, the link between the pedal and the latch is configured such that a movement of the latch does not cause the pedal to move.

Thanks to these provisions, the opening of the door by a manual action on the handle is not likely to cause the door to be blocked if there is an object under the pedal.

In some embodiments, the pedal comprises a damper flange.

This flange makes it possible to prevent the wall being marked when the pedal touches it.

In some embodiments, the extension comprises a damper flange.

This flange makes it possible to prevent the wall being marked when the extension touches it.

In some embodiments, the surface of the door intended to be pushed is equipped with a backplate, thereby allowing the door to be opened by pushing with the foot.

According to a second aspect, the present invention envisages a door comprising a device that is the subject of the invention.

In some embodiments, at least one pull plate is incorporated into the body of the door and cannot be seen from the outside of the door, except for its extension, when the door is closed.

According to a third aspect, the present invention envisages a method for installing a locking device for a door that is the subject of the invention, which comprises the following steps:

unhinging the door from its frame;

cutting out a slot by means of a template equipped with a window having dimensions matching the dimensions of the panel of a bolt, at a height relative to the foot of the door of between thirty and eighty centimetres;

positioning the panel of the bolt in the slot and attaching a pull plate with a backplate on either side of the door;

positioning an extension of the pull plate close to the foot of the door, an extension configured to be driven by the foot or the lower leg of the user;

placing the door in the frame;

drilling a housing in the frame, positioning a striker or mounting a stud, at the height of the bolt; and inserting the bar of the bolt and mounting a pusher means on the bar of the bolt, the bar of the bolt sliding in the panel secured to the pull plate.

Thanks to these provisions, the locking device according to the invention can be installed on any type of door already in place without difficulty. These provisions also have the advantage of enabling an existing set of doors to be adapted, rather than replaced, in order to address a health requirement.

As the particular aims, advantages and features of the door that is the subject of the invention and the method that is the subject of the invention are similar to those of the device that is the subject of the invention, they are not repeated here.

BRIEF DESCRIPTION OF THE FIGURES

Other advantages, aims and particular features of the invention will become apparent from the non-limiting description that follows of at least one particular embodiment of the device and method that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that the figures are to scale, but the various figures may be to different scales.

Figure 1:
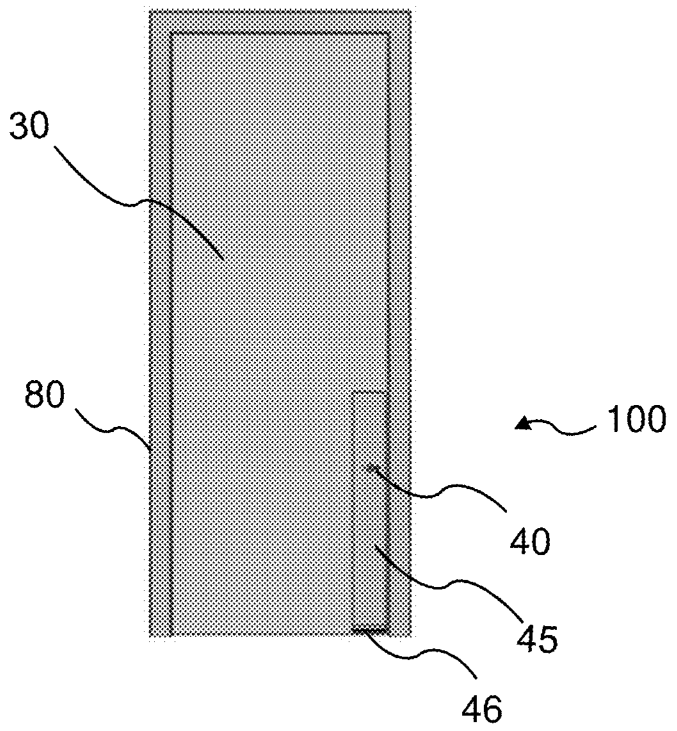
FIG. 1 represents, schematically and in a front view, a first particular embodiment of the locking device that is the subject of this invention.
Figure 2:
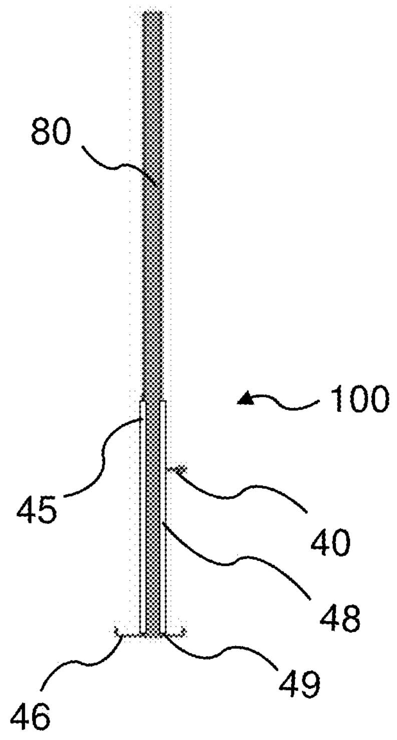
FIG. 2 represents, schematically and in a side view, the locking device shown in FIG. 1.

FIGS. 1 and 2 show a schematic view of a first particular embodiment of the locking device 100 that is the subject of the invention.

The locking device 100 makes it possible to lock a door 30 accommodated in a frame 80, more commonly referred to as a doorframe. The device 100 comprises a bolt 40 positioned at a height of between thirty and eighty centimetres from the floor, i.e. from the lowest edge of the door 30, preferably between forty and eighty centimetres from the floor, and more preferably between forty and seventy centimetres from the floor. Preferably the bolt 40 is positioned at a height of between forty-five and fifty-five centimetres, for example at fifty-five centimetres from the floor.

The bolt 40 is described with reference to FIGS. 3 and 4, and 7 to 9.

The device 100 comprises a pull plate 45 comprising a flat surface affixed on a surface of the door 30, and a backplate 48 comprising a flat surface affixed on the other surface of the door 30. The pull plate 45 and the backplate 48 are preferably attached to each other by fastening means, for example by clamping bolts (not shown) going through the door 30 so as to enclose the door 30.

The characteristics of the plate 45 and backplate 48 are described with reference to FIGS. 5 and 6.

Figure 3:
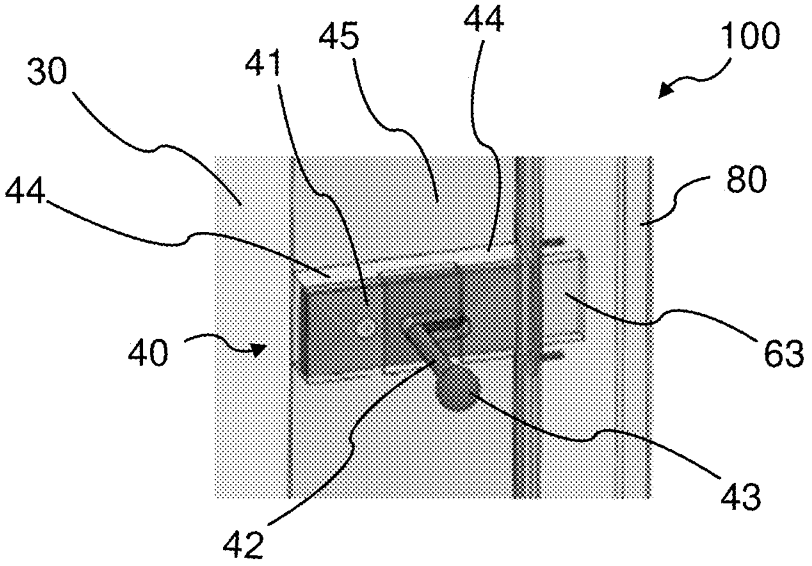
FIG. 3 represents, schematically and in a perspective view, a detail of the bolt, in the open position, of the locking device that is the subject of this invention shown in FIGS. 1 and 2.
Figure 4:
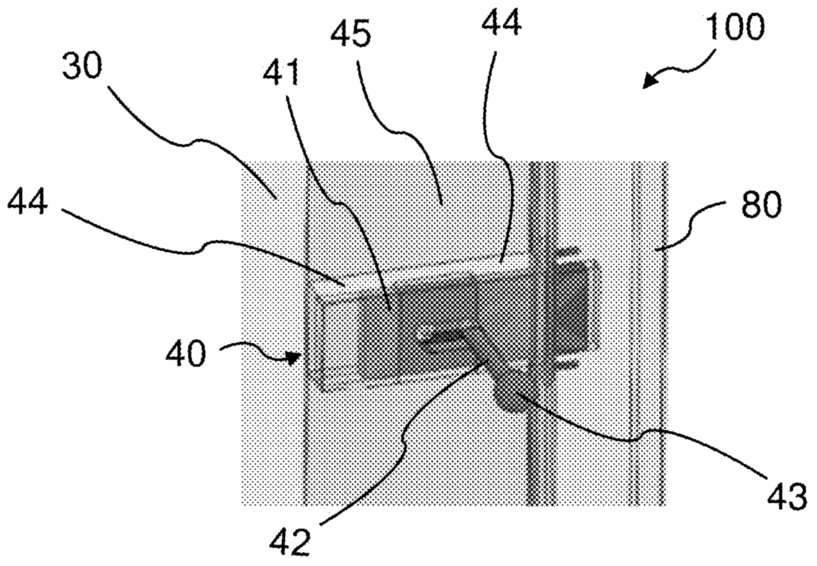
FIG. 4 represents, schematically and in a perspective view, the detail of the bolt shown in FIG. 3, in the closed position.

FIGS. 3 and 4 show the bolt 40 mounted on a pull plate 45. The bolt 40 comprises a bar 41 mounted free in translation in a panel 44. Preferably, the panel 44 is monolithic with the pull plate 45 and comprises two lugs that support and constrain the movement of the bar 41. It is specified that the two lugs shown in FIGS. 3 and 4 are represented partially transparent.

The translational movement of the bar 41 in the panel 44 is constrained by two stops. The bolt 40 can adopt two positions corresponding to the two extreme positions of the bar 41.

In FIG. 3, the bolt 40 is in the open position, i.e. completely disengaged from the housing 63 made in the frame 80. Preferably, the housing 63 comprises a striker. In this open position of the bolt 40, the door 30 can be opened. In FIG. 4, the bolt 40 is in the closed position, i.e. engaged in the housing 63. In this closed position of the bolt 40, the door 30 is locked in place.

The translation of the bar 41 in the panel 44 is actuated by the application of a lateral force on a pusher means 43 secured to the bar 41. Preferably, a stem 42 connects the bar 41 to the pusher means 43 so that the pusher means is clear of the surface of the door to facilitate its actuation by the knee. Preferably, the stem 42 passes through an oblong hole 61 drilled in the backplate 48. The two extremities of the oblong hole 61 are, in this case, the stops limiting the translational movement of the bar 41.

The bolt 40 is positioned on the door 30 at a height relative to the foot of the door of between thirty and eighty centimetres, preferably between forty and eighty centimetres, and more preferably between forty and seventy centimetres. The bar of the bolt can be engaged with or disengaged from the housing secured to the frame 80 by pressure of a user's knee against the pusher means 43.

In addition, the free extremity of the pusher means 43 is spaced at least four centimetres from the door 30 by the stem 42. Preferably, the free extremity of the pusher means 43 is spaced at least six centimetres from the door 30 by the stem 42, e.g. six centimetres.

Figure 5:
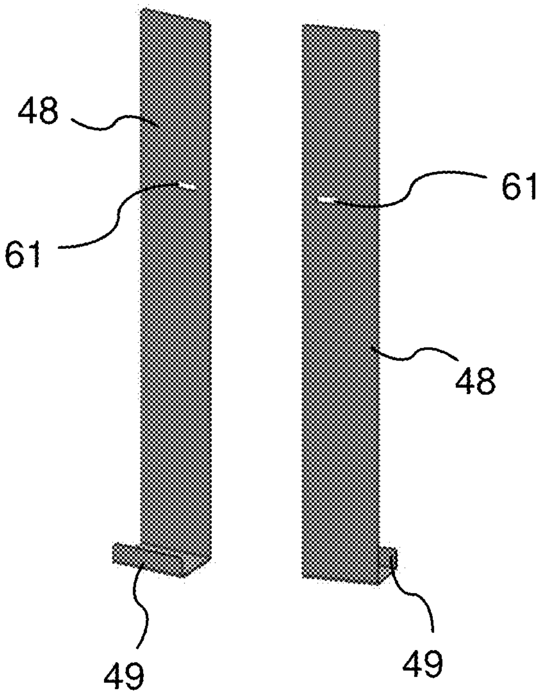
FIG. 5 represents, schematically and in a perspective view, two views side by side of a single backplate, implemented in the locking device shown in FIGS. 1 to 4, according to two different viewing angles.
Figure 6:
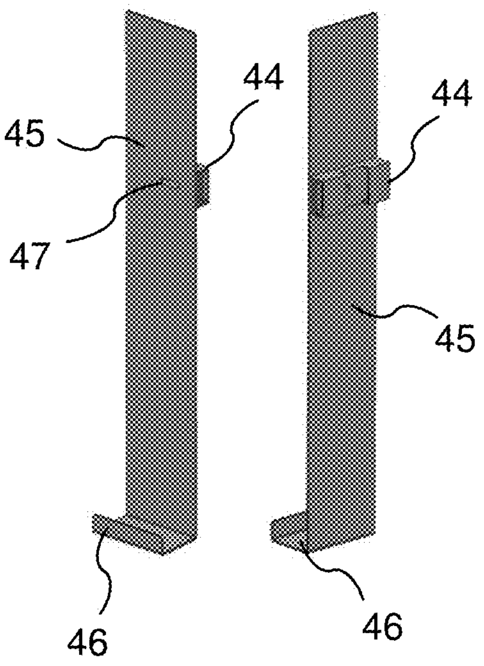
FIG. 6 represents, schematically and in a perspective view, two views side by side of a single pull plate, implemented in the locking device shown in FIGS. 1 to 5, according to two different viewing angles.

FIG. 5 shows a single backplate 48 according to two different viewing angles. FIG. 6 shows a single pull plate 45 according to two different viewing angles.

The pull plate 45 comprises the panel 44 of the bolt 40. The pull plate 45 is pierced by a hole 47 whose function is described with reference to FIGS. 7 to 9.

The backplate 48 comprises an oblong through hole 61 dimensioned for the stem 42 of the bolt 40 to pass through.

The pull plate 45 and the backplate 48 each comprise an extension, respectively 46 and 49, positioned close to the foot of the door and configured to be driven by the foot or the lower leg of the user. For example, the extension, 46 or 49, has a "U" shape or a hook shape that can be grasped by the foot or by the heel of the user.

In some embodiments, the extension, 46 or 49, comprises a damper flange. For example, the damper flange is a ring made of artificial rubber positioned on the perimeter of the extension, 46 or 49.

Figure 7:
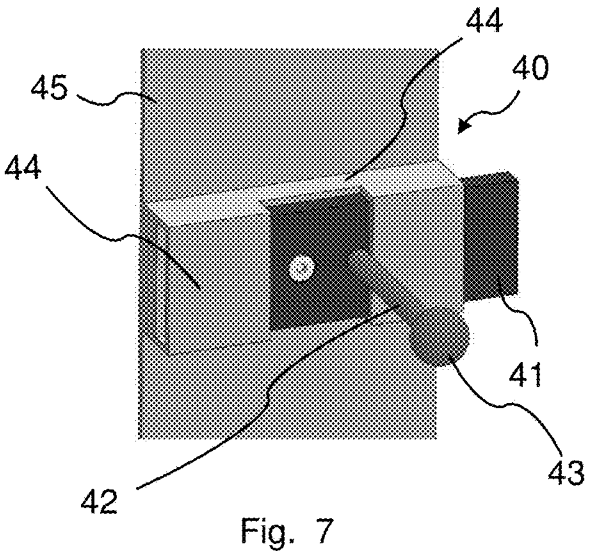
FIG. 7 represents, schematically and in a perspective view, a detail of a bolt of the locking device shown in FIGS. 1 to 6, in the closed position.
Figure 8:
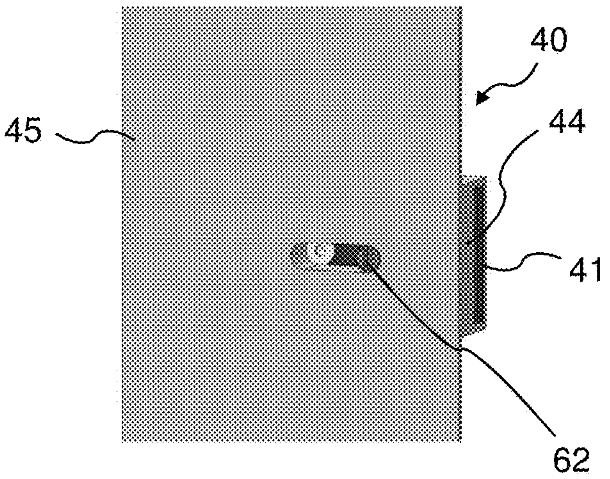
FIG. 8 represents, schematically and in a perspective view, the detail of a bolt of the locking device shown in FIGS. 1 to 7, in the open position.
Figure 9:
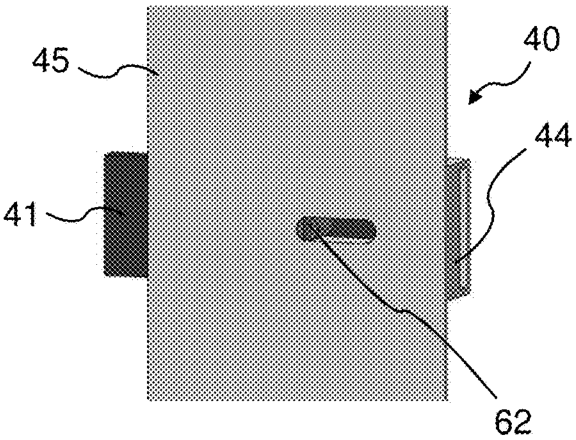
FIG. 9 represents, schematically and in a perspective view, the detail of a bolt implemented in the locking device shown in FIGS. 1 to 8, in the closed position.

FIGS. 7, 8 and 9 represent, schematically and in a perspective view, the detail of the bolt 40 implemented in the first embodiment of the device 100. FIGS. 7 and 9 show the bolt 40 in a closed position. FIG. 8 shows the bolt 40 in an open position.

The pull plate 45 is pierced by a through hole 61, aligned with a grasping relief 62 positioned on the bar 41 or secured to it. The through hole 61 allows the passage of a tool, for example a rigid stick, a key or a screwdriver, such that the tool can be pressed against the grasping relief 62 to engage or disengage the bolt 40.

Figure 10:
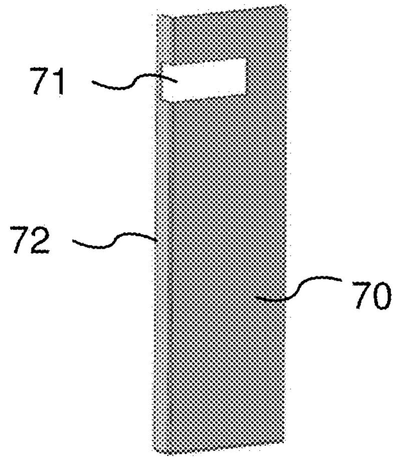
FIG. 10 represents, schematically and in a perspective view, a template used in a particular embodiment of the method for installing a locking device that is the subject of the invention.
Figure 11:
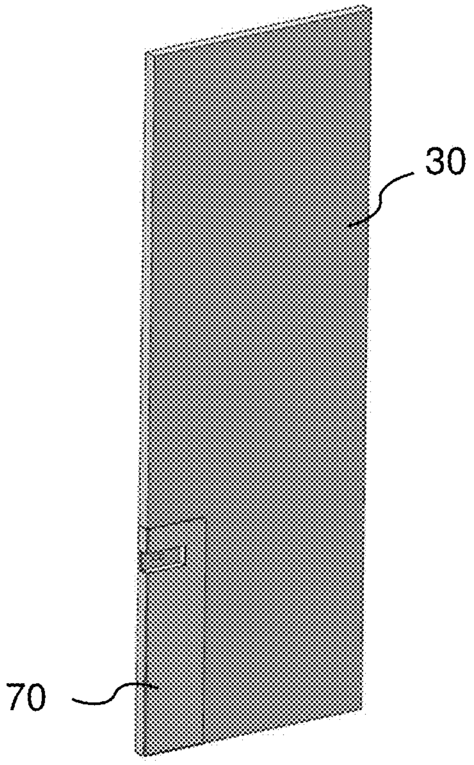
FIG. 11 represents, schematically and in a perspective view, the template of FIG. 10, placed against a door during the implementation of the method for installing a locking device that is the subject of the invention.
Figure 12:
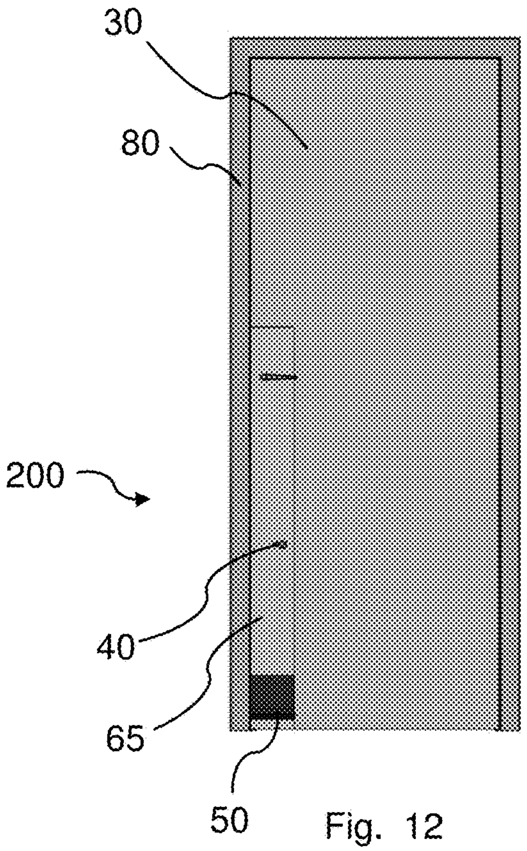
FIG. 12 represents, schematically and in a front view, a second particular embodiment of the locking device that is the subject of the invention.
Figure 13:
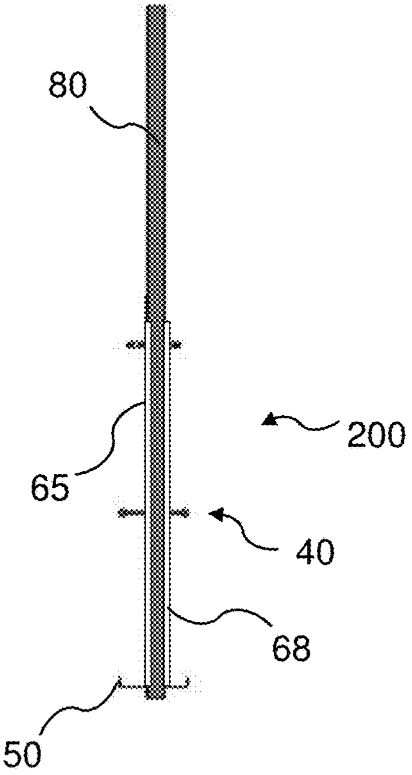
FIG. 13 represents, schematically and in a side view, the locking device shown in FIG. 12.

FIGS. 10 and 11 show a template 70 useful for implementing the method for installing a locking device that is the subject of the invention, a method detailed with reference to FIG. 20. The template 70 comprises at least one band 72 bent at a right angle and intended to be abutted against a section of the door 30 in its largest dimension, i.e. its height. Preferably, the template 70 comprises a second band bent at a right angle, intended to abut against the section of the door 30 in its intermediate dimension, i.e. its width, as shown in FIG. 11. Therefore, the template 70 has a shape complementary with the corner of a door 30 and serves as a model for cutting out a cavity having dimensions matching the dimensions of the panel 44 of the bolt 40. FIGS. 12 and 13 represents, schematically, a second particular embodiment of the locking device 200 that is the subject of the invention.

The locking device 200 makes it possible to lock a door 30 accommodated in a frame 80. The device 200 comprises a bolt 40 positioned at a height relative to the foot of the door of between thirty and eighty centimetres, preferably between forty and eighty centimetres, and more preferably between forty and seventy centimetres. Preferably, the bolt 40 is similar to the one already described above.

The device 200 comprises a pull plate 65 comprising a flat surface affixed on a surface of the door 30, and a backplate 68 comprising a flat surface affixed on the other surface of the door 30. The pull plate 65 and the backplate 68 are preferably attached to each other by fastening means, for example by clamping bolts (not shown) going through the door 30 so as to enclose the door 30.

The characteristics of the pull plate 65 and backplate 68 are described with reference to FIGS. 17 and 18.

Figure 14:
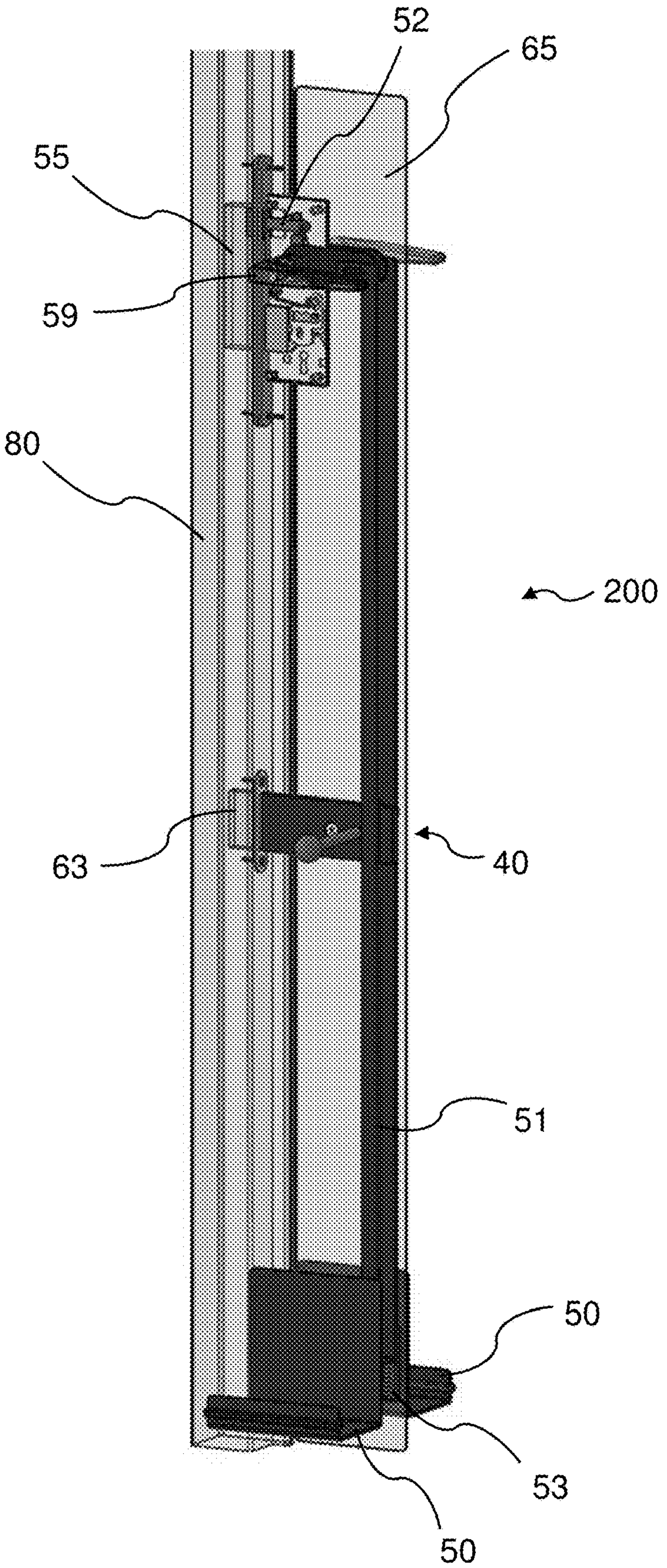
FIG. 14 represents, schematically and in a perspective view, the locking device shown in FIGS. 12 and 13.

FIG. 14 represents, schematically and in perspective, the locking device 200. It is stated that the door 30 and backplate 68 are not represented here in order to better show the other elements of the locking device 200.

The device 200 differs from the device 100 described above in that it comprises a pedal 50 secured to a rod 51 actuating a latch 52, such that the latch 52 can be disengaged from a striker 55, mounted in the frame 80, by pressure of a user's foot on the pedal 50. This mechanism is accommodated in a space delimited by the pull plate 65 and the backplate 68 and is therefore not visible under the normal condition of use of the locking device 200.

In some embodiments, the pull plate 65 and backplate 68 are elongated to cover the entire height of the door 30. Preferably, the pull plate 65 and backplate 68 are made from a material identical to that of the handle 59, when this is retained, to harmonise the whole. The pull plate 65 and backplate 68 can comprise any type of material, in particular stainless steel, aluminium, alloys and/or plastic polymers, and/or composite materials. Preferably, the pull plate 65 and backplate 68 comprise stainless steel.

In some embodiments, a door number or a pictograph is imprinted on the pull plate 65 or backplate 68 or a panel is provided for this use.

In some embodiments, the device 200 comprises an additional part making it possible to keep the door open when it is equipped with a door closer. It consists, for example, of a wedge, a hook or a door chain.

In some embodiments, a vertical slot, which extends from the pedal to the bolt and has dimensions matching the dimensions of the rod 51, is formed in the pull plate 65 and/or in the backplate 68. Therefore, the rod 51 can be positioned in the slot.

Figure 15:
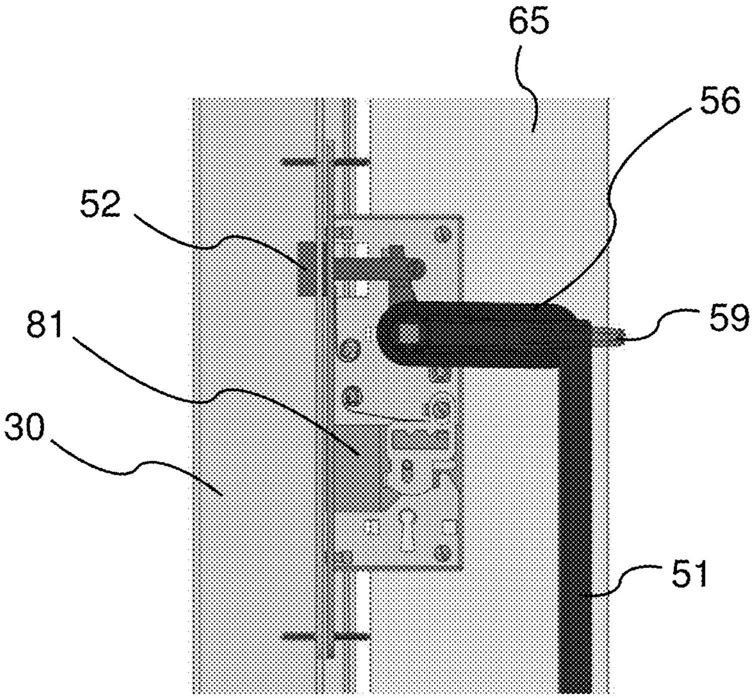
FIG. 15 represents, schematically, the actuating mechanism of the latch implemented in the locking device shown in FIGS. 12 to 14, in the closed position.
Figure 16:
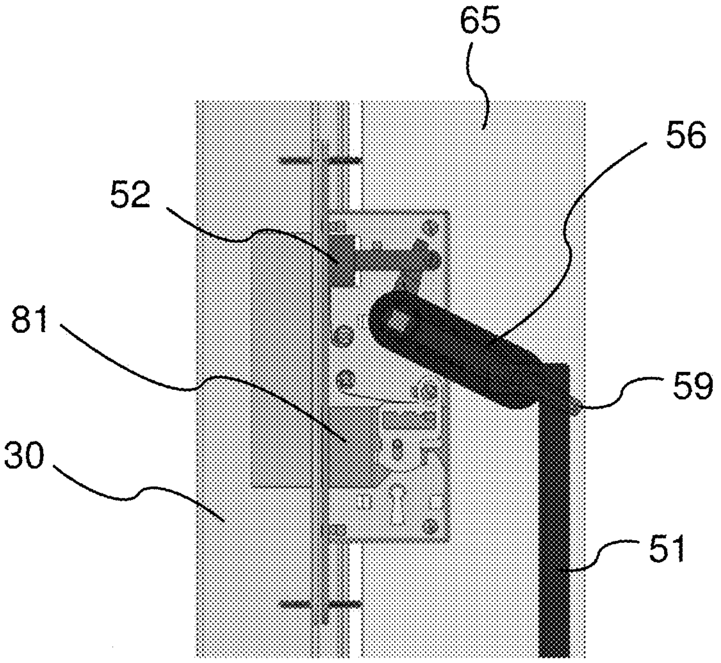
FIG. 16 represents, schematically, the actuating mechanism of the latch implemented in the locking device shown in FIGS. 12 to 15, in the open position.

FIGS. 15 and 16 show the actuating mechanism of the latch 52, implemented in the device 200. This mechanism comprises the latch 52 connected to the rod 51 by means of a pivot 56 configured to convert a vertical traction force exerted on the stick into a horizontal traction force on the latch 52. Any other similar type of mechanical link well known to the person skilled in the art can serve here as a pivot.

In FIG. 15, the actuating mechanism of the latch is represented in a closed position, i.e. with the latch 52 engaged in the striker 55 mounted in the frame 80. Conversely, in FIG. 16, the actuating mechanism of the latch is represented in an open position. In some embodiments, the pivot 56 is also secured to a conventional handle 59, thereby enabling the latch 52 to be disengaged either by means of the pedal or by means of the handle 59, at the user's choice.

Figure 19:
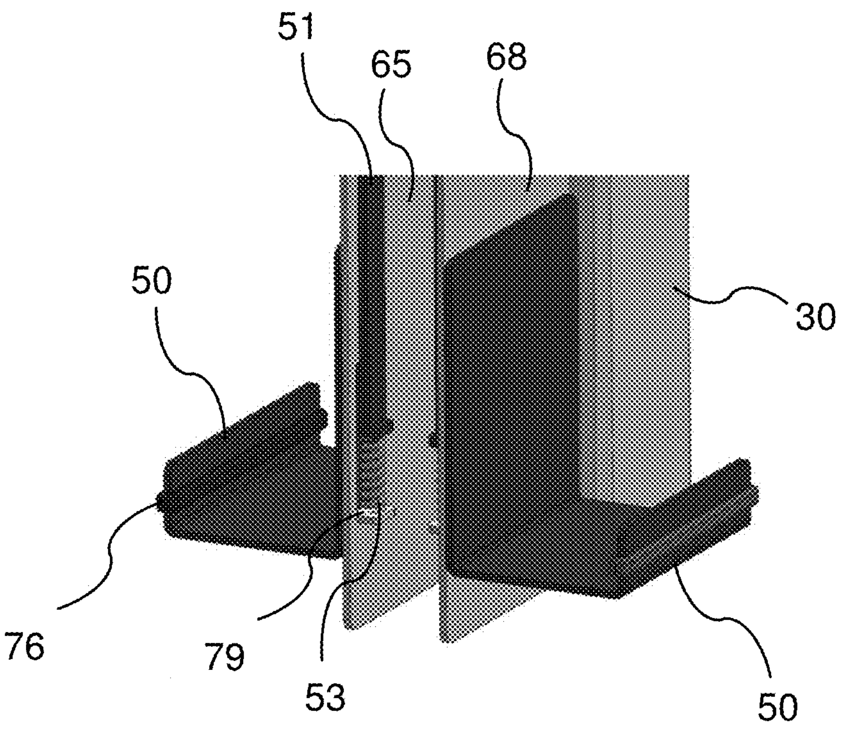
FIG. 19 represents, schematically and in a perspective view, a detail of the pedal of the locking device shown in FIG. 14, according to another viewing angle.

FIG. 19 shows, schematically and in a perspective view, the lower portion of the device 200 shown in FIG. 14, according to another viewing angle. An assembly formed of the rod 51 and the pedal 50 is mounted on the pull plate 65. The force exerted by the user's foot on the pedal 50 actuates the downward movement of the rod 51. The pedal 50 comprises a damper flange 76. Therefore, the door stop fixed in the ground of the prior art can be absent, which makes maintenance of the floor easier.

In some embodiments, the pedal 50 comprises an elastic return means for the pedal enabling the latch 52 to be returned to a rest position, actuated by the movement of the pedal. Preferably, the return means is a spring 53 pressed against a stop 79 by the rod 51 when a force is exerted on the pedal 50 secured to the rod 51.

In some embodiments, the same pedal system is mounted on the backplate 68.

In some embodiments, the extension, 46 or 49, comprises a damper flange 76. For example, the damper flange is a ring made of artificial rubber positioned on a curved portion at the free extremity of the pedal 50.

Figure 17:
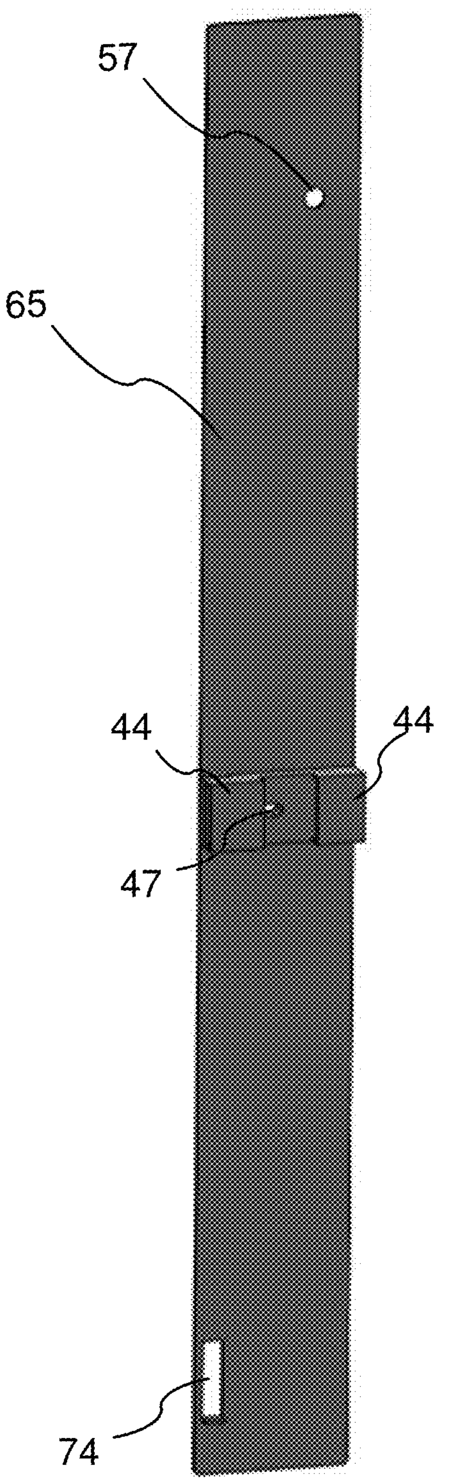
FIG. 17 represents, schematically and in a perspective view, a pull plate, implemented in the locking device shown in FIGS. 12 to 16.
Figure 18:
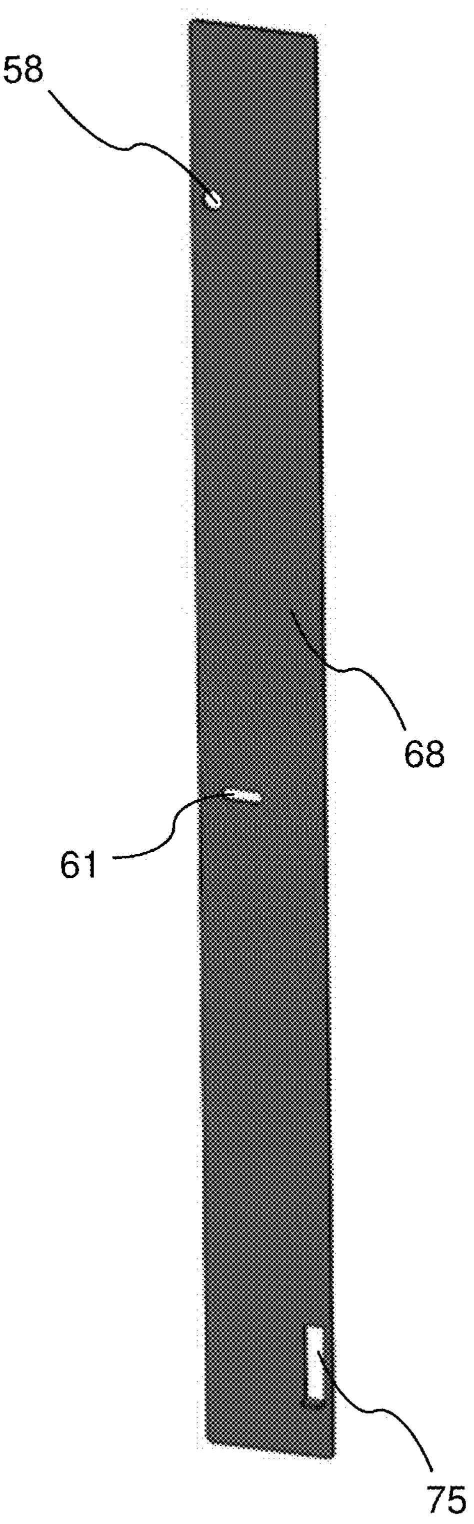
FIG. 18 represents, schematically and in a perspective view, a backplate, implemented in the locking device shown in FIGS. 12 to 17.

FIG. 17 represents, schematically and in a perspective view, the pull plate 65, and FIG. 18 represents, schematically and in a perspective view, the backplate 68 of the locking device 200. The elements described above, in particular in FIGS. 5 and 6, are not described again here. The pull plate 65 and backplate 68 differ from the corresponding plates of the first embodiment 100 in that they are extended up to the height of the handle 59, at about one metre from the floor. The pull plate 65 and backplate 68 also differ from the corresponding plates of the first embodiment 100 in that they comprise an opening, 74 and 75, dimensioned to accommodate a spring 53 and a mechanical link between the pedal 50 and the rod 51. In addition, the pull plate 65 and backplate 68 are pierced with holes, 57 and 58, making it possible to accommodate the axis of a door handle 59 making it possible to actuate the pivot shown in FIGS. 15 and 16.

The link between the pedal 50 and the latch is preferably configured such that a movement of the latch 52 does not cause the pedal 50 to move. By providing for a stop on the sliding link of the pedal 50 on the rod 51, the descent of the pedal 50 causes the rod 51 to descend, but the decent of the rod 51 does not cause the pedal 50 to descend. This therefore avoids a risk of the door jamming if the handle 59 is operated by hand, especially if there is an object under the pedal 50. Of course, a cable link operating in tension but not in compression (e.g. a cable that is not guided in a sleeve) makes the same technical result possible.

In some embodiments (not shown), the device that is the subject of the invention is incorporated in the volume of the door, only the means for actuation by the knee and/or foot protruding from the surface of the door. In these embodiments, the pull plates 45 and 65 are incorporated in the body of the door and are therefore, except for their extension 46 or 49, not visible from the outside of the door when the door is closed, and possibly also when the door is open.

In some embodiments (not shown), the link between the pusher means 43 that can be actuated by the knee and the bar 41 of the bolt 40 is a cable link, not a link using at least one rigid part.

In some embodiments (not shown), the link between the pedal 50 and the latch 52 allowing the latch 52 to be disengaged from the striker 55 by pressure of a user's foot on the pedal 50 is a cable link, not a link using rigid parts. Preferably, the cable is not completely within a sleeve for operating in tension but not in compression. This therefore avoids a downward movement of the handle, for example through the action of a user's hand, leading to a downward movement of the pedal, which may result in the door being blocked, especially if there is an object under the pedal.

In some embodiments, the actuation of the bolt 40 causes the actuation of the latch 52. For example, a cable guided by pulleys exerts traction on the deadbolt 81 when the bar 41 exits from the housing 63. Of course, a linkage with a stop can replace a cable guided by pulleys to obtain the same mechanical effect.

In some embodiments, the latch is replaced by an olive and/or the lock is of the mortice lock type.

Figure 20:
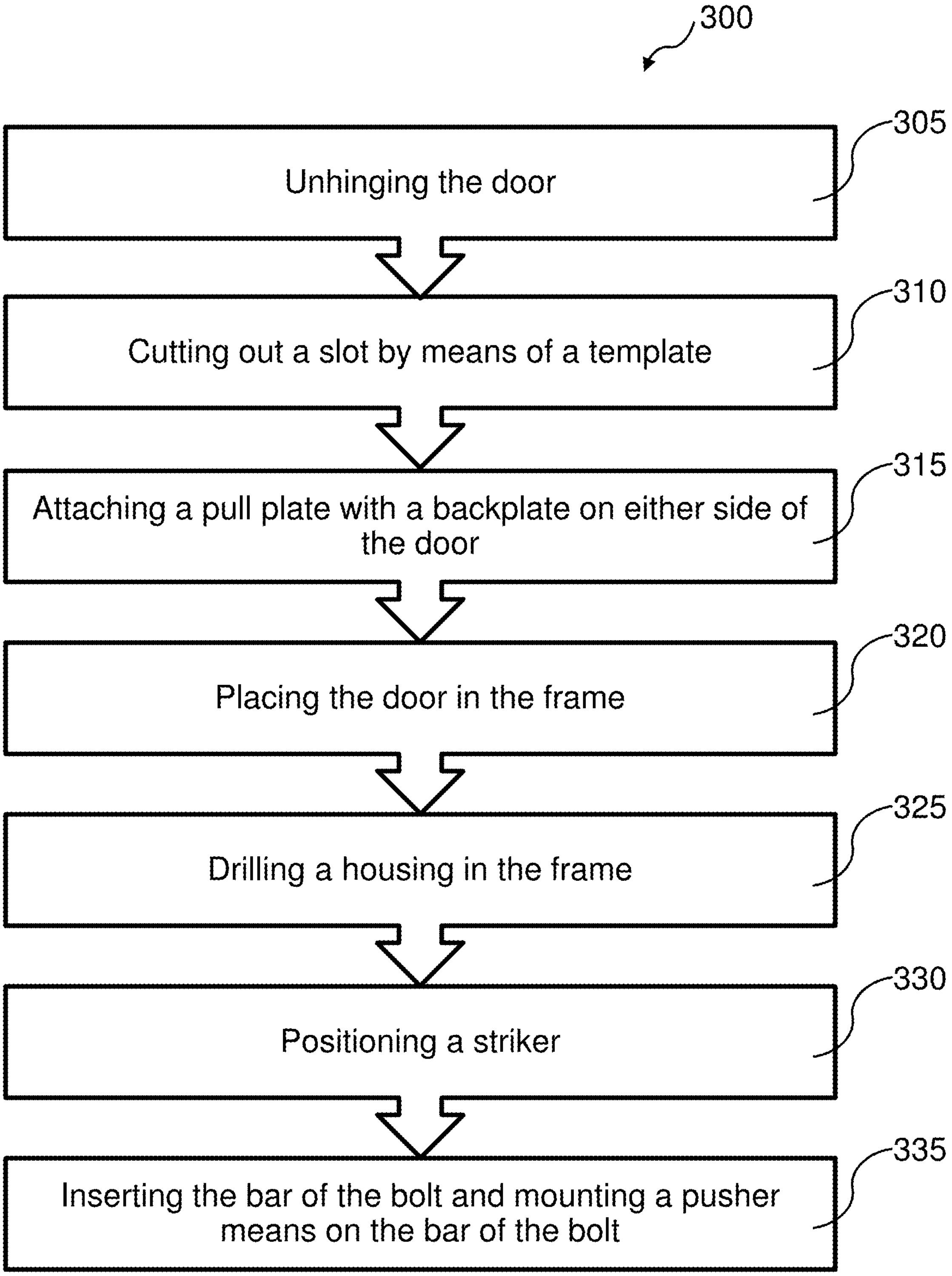
FIG. 20 represents, schematically and in the form of a logic diagram, a series of steps of a particular embodiment of the method for installing a locking device for a door, that is the subject of the invention.

FIG. 20 represents, schematically and in the form of a logic diagram, a series of steps of a particular embodiment of the method 300 for installing a locking device for a door, that is the subject of the invention.

The method 300 for installing a locking device for a door comprises the following steps:

- 305, unhinging the door from its frame;
- 310, cutting out a slot by means of a template equipped with a window having dimensions matching the dimensions of the panel of a bolt, at a height relative to the foot of the door of between thirty and eighty centimetres and, preferably, between forty and eighty centimetres, and more preferably between forty and seventy centimetres;
- 315, positioning the panel of the bolt in the slot and attaching a pull plate with a backplate on either side of the door;
- 320, placing the door in the frame;
- drilling a housing in the frame, 330 positioning a striker or mounting a stud, at the height of the bolt; and
- 335, inserting the bar of the bolt and mounting a pusher means on the bar of the bolt.

In particular, the step 310 of cutting out a slot by means of a template can be carried out by means of the template shown in FIGS. 10 and 11.

Preferably, the bolt panel is integrally formed in the pull plate. These provisions reduce the number of parts of the device and facilitate its placement. In addition, the positioning of the panel of the bolt in the slot makes it possible, in this case, to easily align the pull plate in the appropriate position.

In some embodiments, the method 300 for installing a locking device for a door also comprises the following steps (not shown):

drilling holes configured to accommodate screws connecting a pull plate, equipped with the panel of the bolt, and a backplate;

placing a pivot and a rod, configured to be secured to a pedal;

placing a return means (spring) between the rod and the pedal, and placing the pedal; and placing the door in the frame.

The invention claimed is:

1. A device for locking a door, comprising:

a bolt comprising a bar configured to engage in a housing secured to the frame accommodating the door; and a pusher means secured to the bar;

the bolt being positioned on the door at a height of between thirty and eighty centimetres relative to a foot of the door, such that the bar of the bolt is configured to slide horizontally in a left or right sliding direction so that the bar is engaged with or disengaged from the housing secured to the frame by a pressure, applied in the sliding direction, applied by a user's knee against the pusher means;

wherein the bar of the bolt slides in a panel secured to a pull plate fixed to the door, and wherein the pull plate comprises an extension positioned close to the foot of the door and configured to be driven by a foot or a lower leg of the user, the extension and the pull plate forming a hook shape.

2. The device according to claim 1, wherein the door is sandwiched between the pull plate and a backplate connected to the pull plate by fastening means.

3. The device according to claim 1, which comprises a through hole aligned with a grasping relief positioned on the bar, such that the bolt is configured to be slidably engaged or disengaged by a lateral pressure exerted by means of a tool on the grasping relief, from the side of the door opposite the side on which the pusher means of the bolt is positioned.

4. The device according to claim 1, wherein the free extremity of the pusher means is spaced at least four centimetres from the door by a stem.

5. The device according to claim 1, which comprises a pedal secured to a rod actuating a latch, such that the latch is configured to be disengaged from a striker by pressure of a user's foot on the pedal.

6. The device according to claim 5, wherein the pedal comprises an elastic return means for the pedal enabling the latch to be returned to a rest position.

7. The device according to claim 5, wherein the pedal is connected to the latch by a cable.

8. The device according to claim 5, wherein the link between the pedal and the latch is configured such that a movement of the latch does not cause the pedal to move.

9. The device according to claim 5, wherein the pedal comprises a damper flange.

10. The device according to claim 1, wherein the extension comprises a damper flange.

11. The device according to claim 1, wherein a surface of the door intended to be pushed is equipped with a backplate, thereby allowing the door to be opened by pushing with the foot.

12. A door comprising a device according to claim 1.

13. The door according to claim 12, wherein at least one pull plate is incorporated into the body of the door and cannot be seen from the outside of the door, except for its extension, when the door is closed.

14. A method for installing a device for locking a door according to claim 1, characterized in that it comprises the steps of:

unhinging the door from its frame;

cutting out a slot corresponding to the shape of a template equipped with a window having dimensions matching the dimensions of the panel of the bolt, at a height relative to the foot of the door of between thirty and eighty centimetres;

positioning the panel of the bolt in the slot and attaching a pull plate with a backplate on either side of the door;

positioning the extension of the pull plate close to the foot of the door, an extension configured to be driven by the foot or the lower leg of the user;

placing the door in the frame;

drilling a housing in the frame, positioning a striker or mounting a stud, at the height of the panel of the bolt; and inserting the bar of the bolt and mounting the pusher means on the bar of the bolt, the bar of the bolt sliding in the panel secured to the pull plate.

* * * * *